United States Patent
Kim et al.

(10) Patent No.: US 8,873,481 B2
(45) Date of Patent: Oct. 28, 2014

(54) METHOD AND APPARATUS FOR TRANSMITTING/RECEIVING CONTROL INFORMATION IN A MOBILE COMMUNICATION SYSTEM

(75) Inventors: Kyou-Woong Kim, Seongnam-si (KR); Hyun-Gu Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 311 days.

(21) Appl. No.: 13/034,597

(22) Filed: Feb. 24, 2011

(65) Prior Publication Data

US 2011/0205991 A1 Aug. 25, 2011

(30) Foreign Application Priority Data

Feb. 24, 2010 (KR) .......................... 10-2010-0016538

(51) Int. Cl.
- *H04W 4/00* (2009.01)
- *H04W 72/12* (2009.01)
- *H04W 72/04* (2009.01)
- *H04J 11/00* (2006.01)

(52) U.S. Cl.
CPC ...... *H04W 72/0413* (2013.01); *H04W 72/1278* (2013.01); *H04W 72/1294* (2013.01); *H04J 11/00* (2013.01); *H04W 72/1284* (2013.01); *H04W 72/1289* (2013.01); *H04W 72/042* (2013.01)
USPC .......................................................... 370/329

(58) Field of Classification Search
None
See application file for complete search history.

(56) References Cited

U.S. PATENT DOCUMENTS

| | | | |
|---|---|---|---|
| 2009/0110038 A1* | 4/2009 | Montojo et al. | 375/211 |
| 2010/0067457 A1* | 3/2010 | Wang et al. | 370/329 |
| 2010/0142467 A1* | 6/2010 | Tiirola et al. | 370/329 |
| 2010/0202389 A1* | 8/2010 | Cai et al. | 370/329 |
| 2011/0164584 A1* | 7/2011 | Seo et al. | 370/329 |
| 2011/0194502 A1* | 8/2011 | Sung et al. | 370/329 |

* cited by examiner

*Primary Examiner* — John Blanton
*Assistant Examiner* — Christopher Crutchfield

(57) ABSTRACT

A method and apparatus for transmitting and receiving control information in a mobile communication system. A User Equipment (UE) receives an UpLink Grant (ULG) signal from a BS, and transmits to the BS control information including state information indicating the absence of user data to be transmitted on a Physical Uplink Control CHannel (PUCCH).

20 Claims, 4 Drawing Sheets

METHOD AND APPARATUS FOR TRANSMITTING/RECEIVING CONTROL INFORMATION IN A MOBILE COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Feb. 24, 2010 and assigned Serial No. 10-2010-0016538, the contents of which are incorporated herein by reference.

TECHNICAL FIELD OF THE INVENTION

The present invention relates to a method and apparatus for transmitting/receiving control information in a mobile communication system, and more particularly, to a method and apparatus for transmitting/receiving control information about a User Equipment (UE) that has received an uplink scheduling signal.

BACKGROUND OF THE INVENTION

To transmit user data to a Base Station (BS) in a mobile communication system, a UE employs a procedure for receiving an uplink grant from the BS (i.e. uplink scheduling). Two uplink scheduling schemes are available in a mobile communication system, $3^{rd}$ Generation Partnership Project (3GPP) Long Term Evolution (LTE).

One of the uplink scheduling schemes is that a UE transmits a Scheduling Request (SR) signal to a BS on a Physical Uplink Control CHannel (PUCCH) and the BS grants data transmission of the UE on a Physical Uplink Shared CHannel (PUSCH). The other uplink scheduling scheme is that a BS periodically transmits an UpLink Grant (ULG) signal to a UE, thereby granting data transmission of the UE on a PUSCH.

FIG. 1 illustrates an uplink scheduling scheme based on a ULG signal transmitted by a BS in a cellular communication system.

Referring to FIG. 1, a BS 100 periodically transmits a ULG signal to a UE 102 in block 104 and the UE 102 transmits data to the BS 100 on a PUSCH in block 106.

In the ULG-based uplink scheduling scheme, even in the absence of user data to be transmitted to the BS, the UE that has received a ULG signal and has been allocated to the PUSCH generates a Medium Access Control (MAC) Protocol Data Unit (PDU) padded with zeroes at a MAC layer. The zero-padded MAC PDU is created by padding meaningless information (e.g. '0s') to a MAC Service Data Unit (SDU). This MAC PDU is subjected to a data process including Hybrid Automatic Repeat reQuest (HARQ) processing, channel coding (e.g. turbo coding), control information multiplexing, channel interleaving, and scrambling and is then transmitted over the air in Orthogonal Frequency Division Multiplexing (OFDM) based on Single Carrier-Frequency Division Multiple Access (SC-FDMA) at a physical layer.

Even though the zero-padded MAC PDU carries meaningless data, the UE performs the data process at the MAC layer and the physical layer. The resulting increase in the computation volume of a data processor (e.g. an LTE MODEM) increases the computation resource waste and power consumption of the UE. Transmission of a zero-padded MAC PDU causes severe problems to a UE having limited resources and power, particularly a Software Defined Radio (SDR) UE having all functions of a MODEM implemented in software.

SUMMARY OF THE INVENTION

To address the above-discussed deficiencies of the prior art, it is a primary object to provide at least the advantages described below. Accordingly, an aspect of embodiments of the present invention is to provide a method and apparatus for reducing the computation volume of control information transmitted from a User Equipment (UE) that has received resource allocation information from a Base Station (BS).

Another aspect of embodiments of the present invention is to provide a method and apparatus for reducing power consumption of a UE by preventing an unnecessary data process at Medium Access Control (MAC) and physical layers of the UE.

A further aspect of embodiments of the present invention is to provide a method and apparatus for transmitting control information indicating the absence of user data to be transmitted to a BS at a UE that has received resource allocation information from the BS.

In accordance with an embodiment of the present invention, there is provided a method for transmitting control information at a UE in a mobile communication system, in which an UpLink Grant (ULG) signal is received from a BS, and control information including state information indicating the absence of user data to be transmitted is transmitted on a Physical Uplink Control CHannel (PUCCH) to the BS.

In accordance with another embodiment of the present invention, there is provided a UE apparatus for transmitting control information in a mobile communication system. The UE apparatus includes a control information generator configured to generate control information including state information indicating the absence of user data to be transmitted. The UE apparatus also includes a controller configured to control reception of a ULG signal from a BS and control transmission of the control information on a PUCCH to the BS. The UE apparatus further includes a transceiver configured to receive the ULG signal and transmit the control information.

In accordance with another embodiment of the present invention, there is provided a method for receiving control information at a BS in a mobile communication system, in which a ULG signal is transmitted to a UE, and control information including state information indicating the absence of user data to be transmitted is received from the UE on a PUCCH.

In accordance with a further embodiment of the present invention, there is provided a BS apparatus for receiving control information in a mobile communication system. The BS apparatus includes a controller configured to control generation and transmission of a ULG signal to a UE and control reception of control information including state information indicating the absence of user data to be transmitted on a PUCCH from the UE. The BS apparatus also includes a transceiver configured to transmit the ULG signal and receive the control information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In the description of the present invention, known structures and devices are omitted or are shown in block diagram form, focusing on important features of the structures and devices, so as not to obscure the concept of the present invention. Specific terms used herein are provided to help understanding of the present invention. The terms may be replaced with other terms within the scope and spirit of the present invention.

A description will be given below of a method and apparatus for conducting communication on a control channel on the assumption of an uplink scheduling scheme based on a periodic UpLink Grant (ULG) signal transmitted from a Base Station (BS) (e.g. an evolved Node B (eNB) in a 3rd Generation Partnership Project (3GPP) Long Term Evolution (LTE) system).

While the present invention is described in the context of a 3GPP LTE system being used as a mobile communication system, it is to be understood that the present invention is also applicable to other mobile communication systems.

In accordance with an embodiment of the present invention, when a User Equipment (UE) has received a ULG signal from a BS and thus has been allocated to a Physical Uplink Shared CHannel (PUSCH), if the UE does not have user data to be transmitted, the UE transmits to the BS control information including state information indicating the absence of user data on a Physical Uplink Control CHannel (PUCCH), instead of transmitting a Medium Access Control (MAC) Protocol Data Unit (PDU) padded with zeroes on the PUSCH. Therefore, the constraint of data processing at the MAC and physical layers of the UE, caused by unnecessary transmission of a PUSCH signal, can be reduced and thus the computation resource waste and power consumption of the UE can be decreased.

Optionally, the UE may generate a PUCCH signal by multiplexing the control information with channel quality information such as a Channel Quality Indicator (CQI) or a Carrier to Interference and Noise Ratio (CINR) and may transmit the PUCCH signal to the BS.

In accordance with this embodiment of the present invention, the BS may be aware of the absence of user data at the UE from the control information including the state information indicating the absence of user data to be transmitted to the BS, received on the PUCCH. Accordingly, the BS does not need to perform an unnecessary PUSCH signal process.

Optionally, the BS may extract the CQI from the PUCCH signal by determining whether the signal received on the PUCCH includes the CQI.

Figure 1:
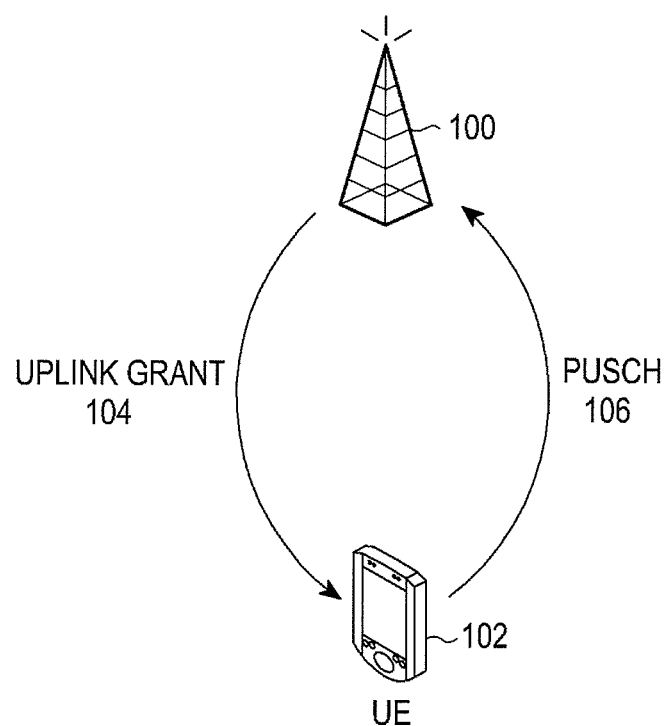
FIG. 1 illustrates an uplink scheduling scheme based on an UpLink Grant (ULG) signal transmitted by a Base Station (BS) in a cellular communication system.
Figure 2:
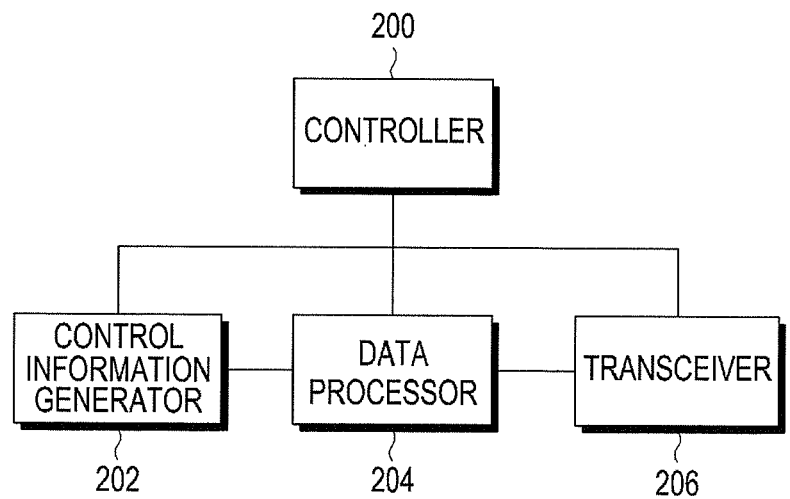
FIG. 2 illustrates a User Equipment (UE) apparatus according to an embodiment of the present invention.

FIG. 2 is a functional block diagram of a UE apparatus according to an embodiment of the present invention.

Referring to FIG. 2, the UE apparatus includes a control information generator 202 for generating control information such as control information including state information indicating the absence of user data to be transmitted, a CQI, or a CINR; a transceiver 206 for transmitting and receiving signals through an antenna; a data processor 204 for processing data of a transmission signal or a received signal at a physical layer; and a controller 200 for controlling operations of the transceiver 206 and the data processor 204 and generating a transmission signal.

The transceiver 206 receives a ULG signal from a BS, transmits a PUSCH signal or a PUCCH signal to the BS, and performs a Radio Frequency (RF) process for a transmission signal and a received signal.

The data processor 204 subjects a PUSCH signal (e.g. a MAC PDU generated at the MAC layer) generated from the controller 200 or the control information generator 202 to Hybrid Automatic Repeat reQuest (HARQ) processing, channel coding, channel interleaving, scrambling, and Single Carrier-Frequency Division Multiple Access (SC-FDMA) processing. In case of a PUCCH signal, the data processor 204 may perform SC-FDMA processing directly on the PUCCH signal without HARQ processing, channel coding, channel interleaving, and scrambling. Consequently, the PUCCH signal uses less computation resources and thus less power than the PUSCH signal.

The SC-FDMA processing of the data processor 204 involves Discrete Fourier Transform (DFT) processing based on the size of a PUSCH Resource Block (RB) allocated by the BS, mapping to a frequency area set by the BS, and generation of a time signal through Inverse Fast Fourier Transform (IFFT). The data processor 204 may also perform appropriate filtering such as shifting an SC-FDMA output by a half of the gap between the time signal and a subcarrier to eliminate a Direct Current (DC) component created after the SC-FDMA process. The data processor 204 converts the filtered signal to an analog signal through Digital-to-Analog Conversion (DAC).

The data processor 204 may perform the above signal transmission operation reversely on a signal received from the BS.

The controller 200 controls operations of the other components 202, 204 and 206 and generates a transmission signal in order to implement a control channel communication method according to an embodiment of the present invention.

The operation of the controller 200 will be detailed below.

The controller 200 acquires resource allocation information about uplink resources allocated to the UE and Modulation & Coding Scheme (MCS) level information for the UE, from a ULG signal received through the transceiver 206 and processed at the data processor 204.

In the presence of user data to be transmitted after the controller 200 has received the ULG signal, the controller 200 generates a MAC PDU including the user data, processes the MAC PDU through the data processor 204, and transmits the processed MAC PDU on a PUSCH through the transceiver 206.

Alternatively, in the absence of user data to be transmitted after receiving the ULG signal from the BS, the controller 204 generates a PUCCH signal and controls transmission of the PUCCH signal through the data processor 204 and the transceiver 206 to the BS. Optionally, the PUCCH signal may be a PUCCH Format 1 or PUCCH Format 2 signal.

The PUCCH signal does not need HARQ processing, channel coding, and channel interleaving. Particularly, it is not necessary to subject the PUCCH signal to DFT. As a consequence, about one fourth (¼) of signal processing for a PUSCH signal of one RB suffices for the PUCCH signal at the physical layer, thereby remarkably reducing the power consumption of the UE. In addition, the UE does not need to generate a MAC PDU for the PUCCH signal, which obviates the need for interaction with the MAC layer. Accordingly, a constraint related to unnecessary user data transmission is eliminated from the MAC layer and thus the computation resource efficiency of the MAC layer is increased.

The control information generator 202 generates control information such as control information including state information indicating the absence of user data to be transmitted, a CQI, or a CINR, and provides the control information to the controller 200, for use in generating a signal to be transmitted on a PUSCH or a PUCCH.

While the controller 200, the control information generator 202, the data processor 204, and the transceiver 206 are shown in FIG. 2 as separately configured in the UE apparatus, they may be incorporated into a single unit or any other suitable number of units.

Figure 3:
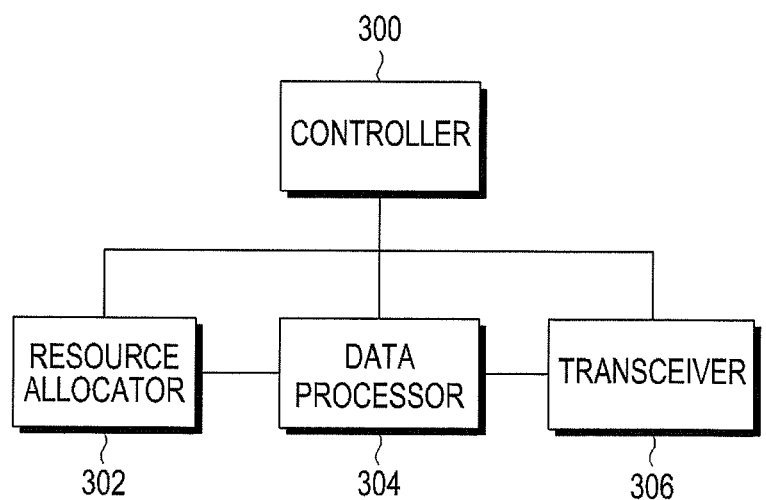
FIG. 3 illustrates a BS apparatus according to an embodiment of the present invention.

FIG. 3 is a functional block diagram of a BS apparatus according to an embodiment of the present invention.

Referring to FIG. 3, the BS apparatus includes a transceiver 306 for transmitting and receiving signals through an antenna; a data processor 304 for processing data of a transmission signal or a received signal at a physical layer; a resource allocator 302 for performing uplink scheduling for UEs; and a controller 300 for controlling operations of the transceiver 306, the data processor 304, and the resource allocator 302 and generating a transmission signal.

The transceiver 306 transmits a ULG signal to a UE, receives a signal from the UE, and performs an RF process on the transmission and received signals.

The data processor 304 performs a data process on a signal generated from the controller 300, such as Analog-to-Digital Conversion (ADC), Fast Fourier Transform (FFT), descrambling, channel deinterleaving, and channel decoding.

The resource allocator 302 performs uplink scheduling and provides resource allocation information about a channel to be allocated to the UE and the size of allocated resources to the controller 300.

The controller 300 controls operations of the other components 302, 304 and 306 and generates a transmission signal in order to perform a control channel communication method according to an embodiment of the present invention.

The operation of the controller 300 will be detailed below.

The controller 300 generates a ULG signal based on resource allocation information received from the resource allocator 302 and controls transmission of the ULG signal in Physical Data Control CHannel (PDCCH) Downlink Control Information (DCI) Format 0 at every predetermined interval to the UE.

Upon receipt of control information including state information indicating the absence of user data to be transmitted from the UE after transmitting the ULG signal, the controller 300 (i.e. the BS apparatus) is aware that the UE does not have user data to be transmitted.

Additionally, the controller 300 may decode a signal received on a PUSCH allocated to the UE and check the Cyclic Redundancy Check (CRC) of the decoded PUSCH signal. If the reception level of the PUSCH signal is lower than or equal to a predetermined threshold such that the PUSCH signal may be considered to be noise, and a PUCCH signal having a reception level equal to or higher than another predetermined threshold is detected, the controller 300 may determine that the UE does not have user data to be transmitted.

Upon determining the absence of user data at the UE, the controller 300 performs a control operation so that a PUSCH signal process is not carried out. Optionally, if the reception level of the PUCCH signal is larger than a threshold and includes a CQI, the controller 300 may extract the CQI from the PUCCH.

Alternatively, upon successful reception of a PUSCH signal, the controller 300 performs a normal reception process on the PUSCH signal.

While the controller 300, the resource allocator 302, the data processor 304, and the transceiver 306 are shown in FIG. 3 as separately configured in the BS apparatus, they may be incorporated into a single unit or any other suitable number of units.

Figure 4:
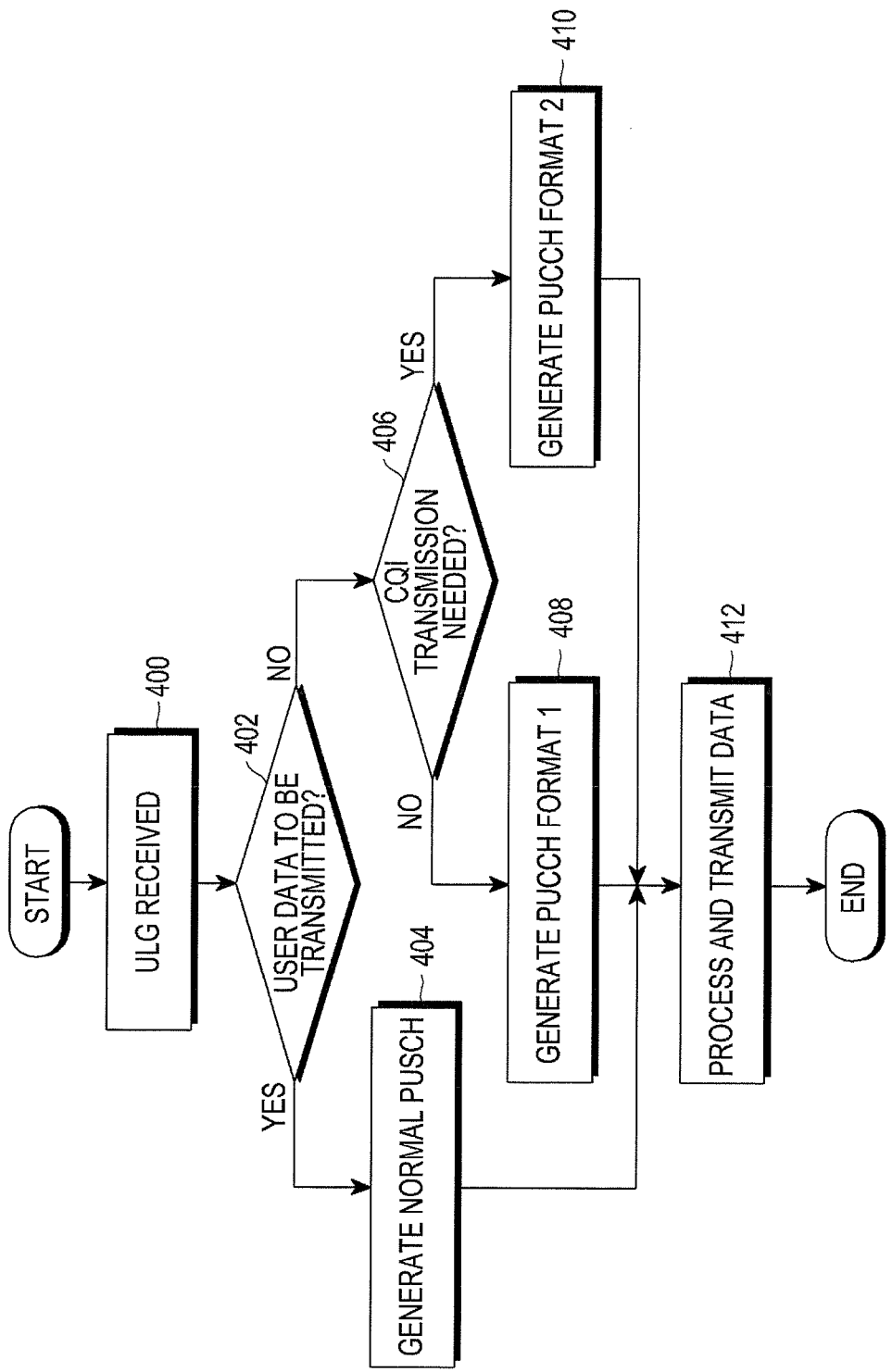
FIG. 4 illustrates a control channel communication method of the UE according to an embodiment of the present invention.

FIG. 4 is a flowchart illustrating a control channel communication method of the UE according to an embodiment of the present invention.

Referring to FIG. 4, the UE apparatus receives a ULG signal in block 400 and determines whether there is uplink user data to be transmitted in block 402.

In the presence of uplink user data, the UE apparatus generates a general PUSCH signal based on resource allocation information included in the ULG signal and transmits the general PUSCH signal on an uplink to the BS in block 404.

Alternatively, in the absence of uplink user data, the UE apparatus transmits control information including state information indicating the absence of user data on a PUCCH to the BS. Herein, the UE apparatus determines from the ULG signal whether the BS requests CQI transmission in block 406. If a CQI is requested to be transmitted, the UE apparatus generates a PUCCH Format 2 signal in block 410. If a CQI is not requested to be transmitted, the UE apparatus generates a PUCCH Format 1 signal in block 408. The state information may be configured in any format. In an embodiment of the present invention, a PUCCH Format 1 signal or a PUCCH Format 2 signal is a control signal including state information indicating the absence of user data to be transmitted.

The UE apparatus then transmits the PUSCH signal or the PUCCH signal to the BS through the transceiver 206 after processing it at the data processor 204 (block 412).

Figure 5:
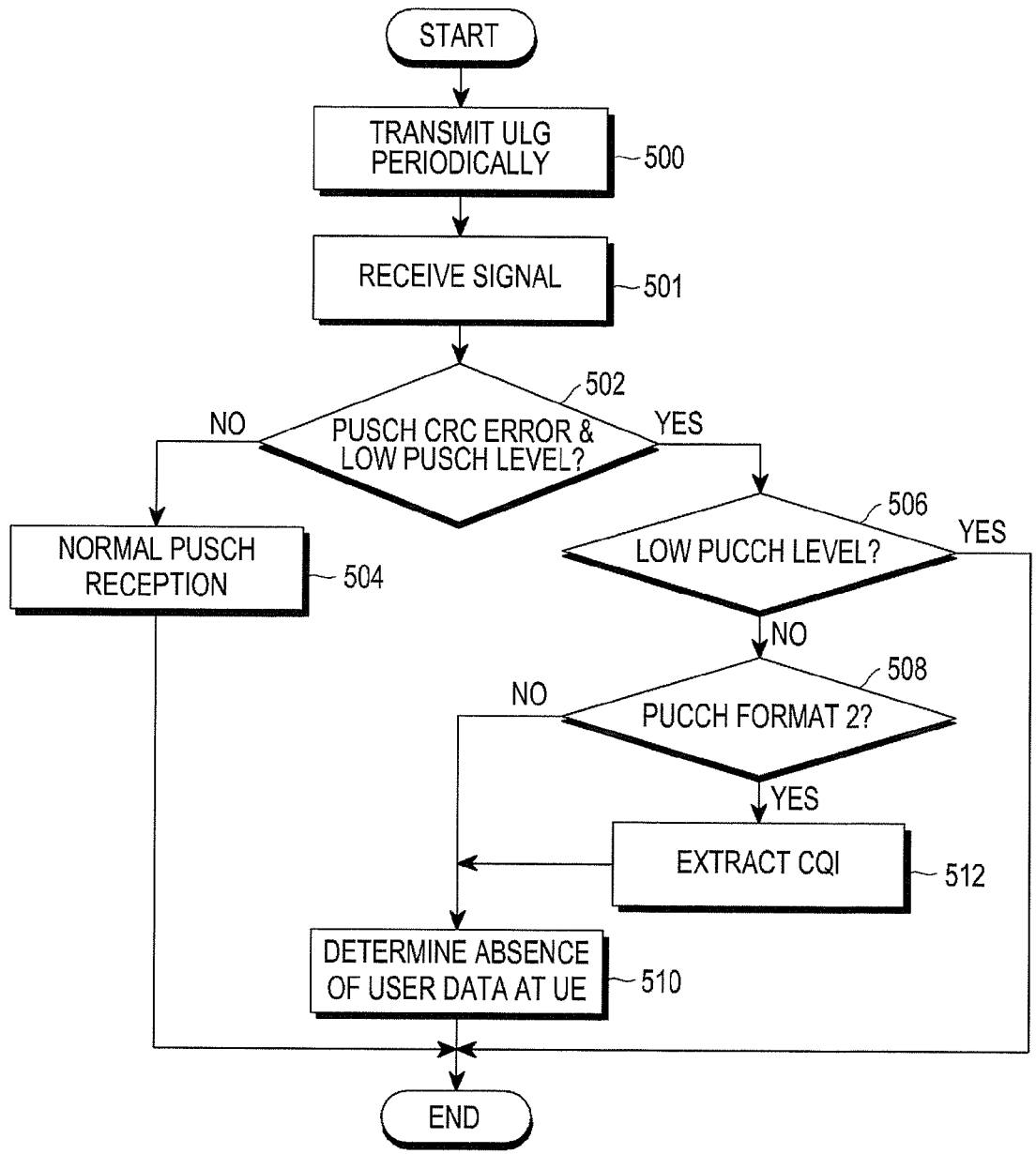
FIG. 5 illustrates a control channel communication method of the BS according to an embodiment of the present invention.

FIG. 5 is a flowchart illustrating a control channel communication method of the BS according to an embodiment of the present invention.

Referring to FIG. 5, the BS periodically generates and transmits a ULG signal to a UE in block 500.

Upon receipt of a signal from the UE in block 501, the BS determines whether a PUSCH signal has an error by performing a CRC check on the PUSCH signal and compares the reception level of the PUSCH signal with a predetermined threshold in block 502.

If a CRC error is detected from the PUSCH signal and the reception level of the PUSCH signal is lower than or equal to the threshold in block 502, the BS compares the reception level of the PUCCH signal with another predetermined threshold in block 506.

If the reception level of the PUCCH signal is equal to or larger than the threshold in block 506, the BS determines that the UE does not have user data to be transmitted, considering that the UE has transmitted the PUCCH signal instead of a PUSCH signal in block 510.

Optionally, the BS determines whether the PUCCH signal having a reception level larger than the threshold includes a CQI in block 508. If the PUCCH signal is a PUCCH Format 2 signal, the BS extracts the CQI from the PUCCH signal in block 512.

Alternatively, if the PUSCH signal does not have a CRC error, the BS may perform a normal PUSCH reception operation in block 504. If the PUSCH signal has a CRC error but the reception level of the PUSCH signal is higher than the threshold, the BS transmits a Negative ACKnowledgment (NACK) signal in the general PUSCH reception operation, determining that the PUSCH signal has a channel error.

It is to be noted that the flowcharts illustrated in FIGS. 4 and 5 are not intended to limit the scope of the present invention. That is, the specific procedures of the UE apparatus and the BS apparatus depicted in FIGS. 4 and 5 are purely exemplary. Thus, it is not necessary to perform all blocks of the procedures or to perform specific blocks individually.

As is apparent from the above description, the present invention can relieve a MAC layer and a physical layer of a UE of signal process constraints and thus reduce the power consumption of the UE. Especially, this effect is more conspicuous in an SDR UE with the functions of a MODEM implemented in software.

The operations according to the foregoing embodiments may be implemented as code that can be written on a memory in a component of a UE apparatus or a BS apparatus. That is, each component of the UE apparatus or the BS apparatus reads the program code from the memory by a processor or a Central Processing Unit (CPU) and executes it, to thereby perform the previously described operation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting control information at a User Equipment (UE) in a mobile communication system, the method comprising:
   receiving an UpLink Grant (ULG) signal from a Base Station (BS);
   generating control information comprising state information indicating the absence of user data to be transmitted on a Physical Uplink Shared Channel (PUSCH); and
   transmitting to the BS the control information comprising the state information on a Physical Uplink Control CHannel (PUCCH).

2. The method of claim 1, wherein the transmission comprises transmitting the control information in the form of a PUCCH Format 1 signal.

3. The method of claim 1, wherein the control information is transmitted on the PUCCH without transmitting a data unit padded with zeroes on the PUSCH.

4. The method of claim 3, wherein the transmission comprises transmitting the control information in the form of a PUCCH Format 2 signal.

5. The method of claim 1, wherein the control information further comprises channel quality information, wherein the channel quality information comprises at least one of a Channel Quality Indicator (CQI) and a Carrier-to-Interference and Noise Ratio (CINR), and wherein the control information is multiplexed with the CQI or the CINR.

6. A User Equipment (UE) apparatus for transmitting control information in a mobile communication system, the UE apparatus comprising:
   a control information generator configured to generate control information comprising state information indicating the absence of user data to be transmitted on a Physical Uplink Shared Channel (PUSCH);
   a controller configured to control reception of an UpLink Grant (ULG) signal from a Base Station (BS) and control transmission of the control information on a Physical Uplink Control CHannel (PUCCH) to the BS; and
   a transceiver configured to receive the ULG signal and transmit the control information.

7. The UE apparatus of claim 6, wherein the controller is configured to control transmission of the control information in the form of a PUCCH Format 1 signal.

8. The UE apparatus of claim 6, wherein the control information is transmitted on the PUCCH without transmitting a data unit padded with zeroes on the PUSCH.

9. The UE apparatus of claim 8, wherein the controller is configured to control transmission of the control information in the form of a PUCCH Format 2 signal.

10. The UE apparatus of claim 6, wherein the control information further comprises channel quality information, wherein the channel quality information comprises at least one of a Channel Quality Indicator (CQI) and a Carrier-to-Interference and Noise Ratio (CINR), and wherein the control information is multiplexed with the CQI or the CINR.

11. A method for receiving control information at a Base Station (BS) in a mobile communication system, the method comprising:
   transmitting an UpLink Grant (ULG) signal to a User Equipment (UE); and
   receiving from the UE on a Physical Uplink Control CHannel (PUCCH) control information comprising state information indicating the absence of user data to be transmitted on a Physical Uplink Shared Channel (PUSCH); and
   checking the absence of user data to be transmitted on the PUSCH based on the state information.

12. The method of claim 11, wherein the reception comprises receiving the control information in the form of a PUCCH Format 1 signal.

13. The method of claim 11, wherein the control information is transmitted on the PUCCH without transmitting a data unit padded with zeroes on the PUSCH.

14. The method of claim 13, wherein the reception comprises receiving the control information in the form of a PUCCH Format 2 signal.

15. The method of claim 11, wherein the control information further comprises channel quality information, wherein the channel quality information comprises at least one of a Channel Quality Indicator (CQI) and a Carrier-to-Interference and Noise Ratio (CINR), and wherein the control information is multiplexed with the CQI or the CINR.

16. A Base Station (BS) apparatus for receiving control information in a mobile communication system, the BS apparatus comprising:

a controller configured to control generation and transmission of an UpLink Grant (ULG) signal to a User Equipment (UE) and control reception of control information comprising state information indicating the absence of user data to be transmitted on a Physical Uplink Shared Channel (PUSCH) from the UE on a Physical Uplink Control CHannel (PUCCH), and check the absence of user data to be transmitted on the PUSCH based on the state information; and a transceiver configured to transmit the ULG signal and receive the control information.

17. The BS apparatus of claim 16, wherein the transceiver is configured to receive the control information in the form of a PUCCH Format 1 signal.

18. The BS apparatus of claim 16, wherein the control information is transmitted on the PUCCH without transmitting a data unit padded with zeroes on the PUSCH.

19. The BS apparatus of claim 18, wherein the transceiver is configured to receive the control information in the form of a PUCCH Format 2 signal.

20. The BS apparatus of claim 16, wherein the control information further comprises channel quality information, wherein the channel quality information comprises at least one of a Channel Quality Indicator (CQI) and a Carrier-to-Interference and Noise Ratio (CINR), and wherein the control information is multiplexed with the CQI or the CINR.

* * * * *